United States Patent [19]

Bavington

[11] Patent Number: 5,657,852
[45] Date of Patent: Aug. 19, 1997

[54] SCREW CONVEYOR FOR TACKY MEDIA

[75] Inventor: Gregory F. Bavington, Toronto, Canada

[73] Assignee: National Rubber Technology Inc., Toronto, Canada

[21] Appl. No.: 551,258

[22] Filed: Oct. 31, 1995

[51] Int. Cl.$^6$ .................................................. B65G 45/10
[52] U.S. Cl. .......................... 198/494; 198/496; 198/498
[58] Field of Search ................................. 198/494, 496, 198/497, 498, 499, 670, 671

[56] References Cited

U.S. PATENT DOCUMENTS

| 265,078 | 9/1882 | Hewitt | 198/952 |
|---|---|---|---|
| 2,245,997 | 6/1941 | Olson | 198/671 |
| 2,778,483 | 1/1957 | Nikkel | 198/494 |
| 3,194,385 | 7/1965 | Barnese | 198/659 |
| 3,540,572 | 11/1970 | McCall | 198/498 |
| 4,430,057 | 2/1984 | Hoover et al. | 198/498 X |

FOREIGN PATENT DOCUMENTS

| 2061503 | 6/1972 | Germany | 198/494 |
|---|---|---|---|
| 4101915 | 4/1992 | Japan | 198/496 |
| 0384759 | 11/1973 | U.S.S.R. | 198/670 |

*Primary Examiner*—James R. Bidwell
*Attorney, Agent, or Firm*—Ridout & Maybee

[57] ABSTRACT

A screw conveyor for tacky media has members such as chains disposed in rest positions extending into the trough laterally of the screw axis. These members are engaged and deflected by the screw blade as it progresses along said axis. The members are subject to a restoring moment, such as the force of gravity, tending to forcefully restore the members to the rest position from the deflected positions so that the media is forcefully impacted by the members and adherent media is dislodged from the blade and agglomerates are disintegrated.

21 Claims, 2 Drawing Sheets

SCREW CONVEYOR FOR TACKY MEDIA

In the course of processing of polymeric materials, the polymeric materials may become tacky by heating up, or otherwise and prone to adhere to the surfaces of equipment with which they come in contact. Further, the tacky materials may tend to agglomerate into masses of substantial size. The build-up of adherent or agglomerated material is generally undesirable and may result in malfunctioning of the equipment, or interfere with the processing. Further, if they are hot the built-up masses and agglomerate tend to retain their heat so that the material may tend to degrade, auto-oxidize or may catch fire, leading to downgrading of product quality, fire hazards, emissions of combustion gases and may make it necessary to shut down the equipment with attendant loss of production.

Attempts have been made to use heat exchanging screw conveyors such as screw coolers to cool down hot tacky media. Such screw coolers may comprise a trough equipped externally with a cooling jacket through which a cooling medium may be flowed, and having an auger having a helical blade having its axis mounted in the trough for conveying the media along the trough for heat exchange contact with the cooling medium. However, these attempts have not been as successful as desired.

For example, applicant's assignee has employed heat exchanging screw conveyor equipment for the cooling of hot tacky rubbery media obtained by mechanical regeneration of vulcanized rubber compound. The regenerated rubber is produced at a relatively high temperature, and, unless cooled quickly, is prone to degradation and auto-oxidation. However, it has been found that the tacky rubber material tends to agglomerate and adhere to the helical flights of the auger, especially adjacent the entrance end of the screw cooler equipment, with the result that the adhered and agglomerated material remains resident in the trough and is not carried along in heat exchange contact with the cooling jacket. This tends to result in an inadequate rate of cooling, and presents problems of auto-oxidation, degradation of the devulcanized or regenerated rubber product and presents a risk of a fire hazard in the cooling equipment.

Similarly, problems can arise with heat exchanging screw conveyors such as screw heaters wherein media within the screw heater may become progressively hotter and more tacky as it progresses along the trough of the screw heater or with non-heat exchanging screw conveyors wherein the media in the trough of conveyor becomes tacky as a result of, for example, mixing or chemical reaction.

In applicant's invention, screw conveyor equipment at least adjacent one end is provided with means for inhibiting media adhesion on the helical auger blade and for inhibiting agglomeration of the tacky material. These means comprise a plurality of members normally disposed in a rest position extending into the trough generally laterally of the axis of the auger and engaged and deflected by the blade as the screw progresses along the axis. The members are subject to a restoring moment tending to forcefully restore them to the rest position from deflected positions, such that the media is forcefully impacted by the members and adherent media is dislodged from the blade and agglomerates are disintegrated. It has been found that, with this arrangement, the auger blade can be kept substantially free of build-up of adherent deposits on it, and the formation of ball-like agglomerates can be avoided, so that proper functioning of the screw conveyor in transporting the media along the trough is maintained.

In one preferred embodiment, the members are relatively heavy flexible members that in the rest position hang vertically within the trough of the screw conveyor, such that they are restored from longitudinally or laterally deflected positions to the rest position by the force of gravity.

In other embodiments, the members may comprise resiliently flexible members, such as resilient and stiffly flexible wire brushes. In such case the restoring force is provided by the resilient reaction of the member to its deflection from its normal or rest position.

It is advantageous and preferred to provide said means for inhibiting media agglomeration and adhesion extending along substantially the entire length of the trough. As the media progresses along the screw conveyor, it may become more or less tacky. However, the point at which the material loses or acquires tackiness may vary dependent on the initial temperature or throughput of the media, the speed of rotation of the screw, and the temperature and rate of flow of cooling or heating medium associated with the screw conveyor in heat exchange relationship. Therefore, it is desirable to provide the above mentioned members along the entire length of the screw conveyor to avoid adhesion to the blade and agglomeration at all points along the length of the conveyor.

Embodiments of the present invention will now be described in more detail by way of example only with reference to the accompanying drawings.

Figure 1:
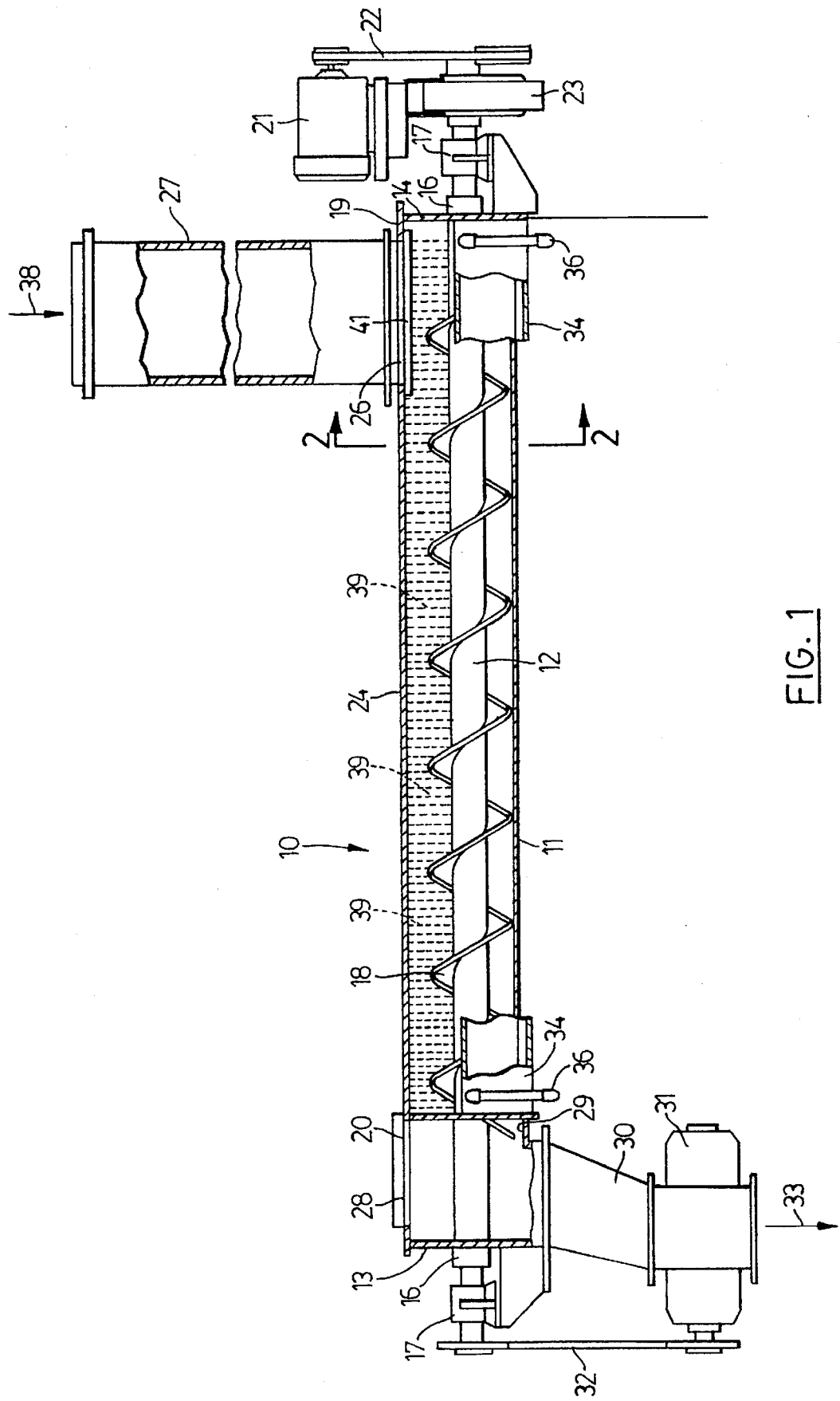
FIG. 1 is a side view, partially in section of a heat exchanging screw conveyor equipped with adhesion and agglomeration inhibiting means in accordance with the invention.
Figure 2:
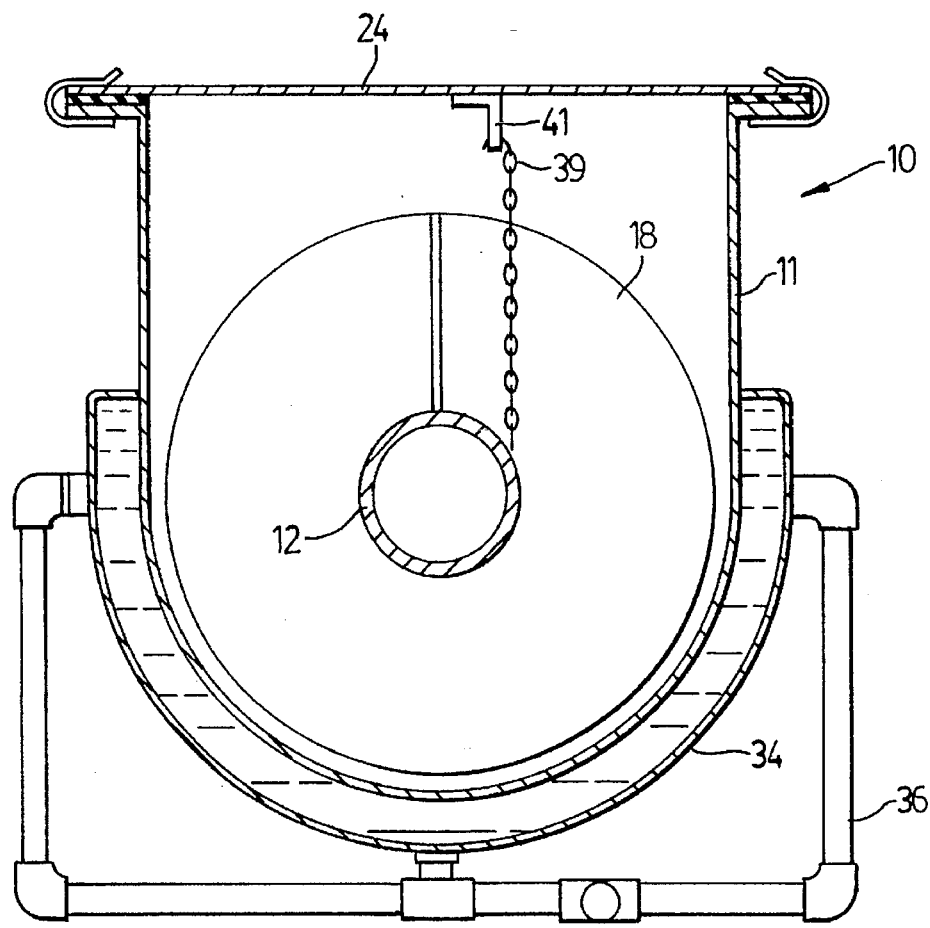
FIG. 2 is a transverse cross-section taken on the line 2—2 in FIG. 1.

Referring to the accompanying drawings, FIG. 1 shows a heat exchanging screw conveyor 10 in the form of a trough 11 generally of U-shape as seen in FIG. 2.

A shaft 12 extends horizontally through the trough 11 generally concentrically with the curved bottom portion of the trough 11. At each end, the shaft 12 passes through vertical end walls 13 and 14 of the trough, and passes through seals or glands 16 disposed in the end wall 13 and 14. The shaft 12 is journalled at each end in a bearing 17 supported outboard of the ends 13 and 14.

The shaft carries a helical blade 18 that, when the shaft 12 is rotated in the conventional manner, conveys material along the trough from an entrance end 19 toward an exit end 20.

The shaft is driven through an electric motor 21, a belt drive 22 and a reducer drive 23.

A rectangular plate 24 closes the upper side of the trough 11, and rests on the upper edges of the side walls of the trough 11. Adjacent the entrance end 19, the plate 24 is provided with a rectangular opening 26 which communicates with a vertically extending chute 27 through which the hot tacky media to be cooled is fed to the screw cooler.

Adjacent the exit end, the plate 24 may be provided with an inspection port 28 which is normally closed with a cover.

At the exit end 20, the lower side of trough 11 is provided with an outlet fitting 29 connecting to a chute 30. At the exit end, the cooled media drops down the chute 30. The chute 30 may be provided with a rotary valve 31 driven through a belt drive 32 from the shaft 12 so that flow out from the chute 30, indicated by arrow 33, may be controlled.

A heat exchange jacket 34 is shown provided over the lower portion of the trough 11 from the entrance end 19 up to the region of the exit fitting 29. The jacket 34 defines with the outer wall of the trough 11 a chamber through which heating or cooling medium, such as hot oil or hot or cold water, may be flowed, supplied and removed through piping 36. In order to provide for a rapid initial rate of heat exchange of the media in the screw conveyor, the heating or cooling medium may be flowed co-currently with the medium. Alternatively, the water or other heating or cooling medium may flow counter-current to the direction of movement of the media in the trough 11, or even through the screw element 12 or 18 itself.

In one example, hot tacky media may be passed downwardly through the chute 27 in the direction of the arrow 38 in FIG. 1. This hot tacky medium may be pieces of regenerated vulcanized rubber compound obtained from a mechanical regenerator, wherein vulcanized rubber compound, for example recycled car tires, in finely divided form, is subjected to intensive mechanical forces in order to regenerate or devulcanize the rubber to a state wherein it can be recompounded, molded and vulcanized to yield a molded cured product having at least a substantial portion of the tensile strength of similarly cured virgin rubber compound. Mechanical processes for regeneration of rubber are in themselves known and are described in, for example U.S. Pat. Nos. 2,461,192; 2,461,193; 2,494,593; 2,487,666; 2,408,296; and 2,221,490. The disclosures of these patents are incorporated herein by reference. Such mechanical processes may be utilized for providing the feed of at least partially regenerated hot tacky rubber passed downwardly in the stream 38 indicated in FIG. 1. In a preferred form, a batch mechanical regenerator of the kind sold under the trademark GELIMAT and available from Draiswerke, Inc., Allendale, N.J. is employed.

Typically, the hot tacky media passed downwardly through the chute 27 may be at a temperature in excess of about 200° C., more typically about 250° to 320° C. Usually, it is desirable to cool such material rapidly by flowing cooling medium through the chamber defined by jacket 34, to prevent problems of degradation of auto-oxidation of the polymer molecules and to avoid risk of the material catching fire.

However, once inside the trough 11 of the screw cooler 10, the particles of hot tacky media tend to agglomerate into ball-like masses which, because of their excessive size do not tend to be conveyed along the screw cooler towards the exit end 20, but tend to remain in the trough 11 adjacent the entrance end 19. Further, the particles of hot tacky media tend to adhere to the flights of the screw 18, and therefore likewise are not conveyed longitudinally along the trough but orbit around the axis of the shaft 12.

Similarly, as discussed above, problems of media adhesion and agglomeration can arise in the case of non-heat exchanging screw conveyors where the particles of media may initially be tacky when they enter the trough of the screw conveyor or they may be non-tacky and may become tacky as a result of mechanical action, mixing or chemical reaction within the screw conveyor. Likewise in the case of a screw heater, that is a screw conveyor adapted for heat exchange heating, the media conveyed may become tacky and adherent and tend to agglomerate, especially toward the exit end of the conveyor.

In the example of a modified heat-exchanging screw conveyor shown in FIGS. 1 and 2, a series of relatively heavy chains 39, for example steel chains are supported above and depending downwardly into the trough 11, preferably extending in a rest position as seen in FIG. 2 offset from the centre axis of the shaft 12 and with the lower end of each chain approximately adjacent to the surface of the shaft 12 so that a substantial portion of the length of each chain 39 is within cylindrical envelope defined by the screw 18. The chains 39 are spaced at small regular intervals longitudinally of the trough 11, the positions of the chains being indicated by broken lines in FIG. 1. The upper ends of the chains 39 may be welded to the underside of the plate 24. Adjacent the opening 26, the chains are suspended from and welded to an angle bracket or angle section bar 41 that spans the opening 26 and is welded at each end to the underside of the plate 24 adjacent the perimeter of the opening 26.

As the helical screw progresses along the trough 11 on rotation of the shaft 12, successive chains 39 are forcefully impacted by successive portions of the leading face of the screw 18. These impacts tend to dislodge media adherent on the leading face of the screw. The action of the screw tends to deflect the chains 39 longitudinally of the trough 11 and upwardly toward the upper portion of the trough to a limiting position in which the chain frees itself from engagement with the screw 18 and because of its weight swings forcefully downwardly again into the trough 11 and impacts on agglomerates within the trough, tending to break them up into smaller pieces which can be conveyed successfully along the trough 11 in heat exchange contact with the medium contained in the jacket 34, thereby providing for rapid cooling of the media. Owing to the inertia of the heavy chain material 39, the impact with the agglomerates is forceful.

Further, as a result of the displacement by and release from the flights of the helical screw 18, the chains have imparted to them a swinging or oscillatory motion, whereby they tend to impact on the trailing edges and faces of the screw 18, thereby dislodging media that is adherent on the trailing face of the screw and tending to break it up into small pieces that can be readily conveyed in heat exchange relationship along the screw conveyor.

Figure 2A:
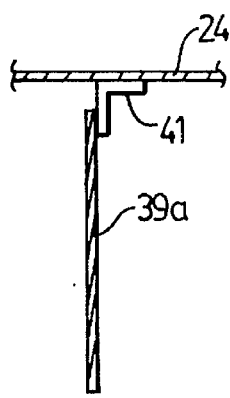
FIGS. 2a, 2b and 2c are partial cross-sections corresponding to FIG. 2 showing alternative forms of deflectable and self-restoring members.
Figure 2B:
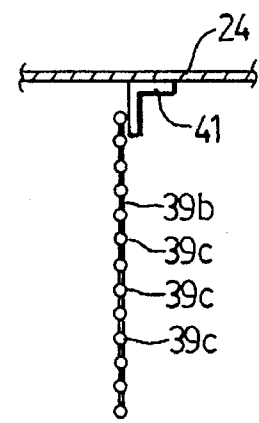

Instead of chains as illustrated in FIGS. 1 and 2, other members may be employed that will tend to forcefully return to a rest position from deflected positions in order to forcefully impact the media, dislodge adherent media from the helical blade 18 and disintegrate agglomerates within the trough. The members may comprise other depending members that are flexible and are relatively heavy and exhibit substantial inertia, such that after deflection longitudinally and upwardly, they are restored forcefully toward the rest position and impact forcefully on agglomerates and on the leading surface of the helical screw 18 disposed in the path of travel of the member as it swings towards the rest position. For example, instead of the chains 39, the members may be heavy flexible cable, for example steel cable or wire rope, for example heavy steel wire rope 39a, as shown in FIG. 2a, or cables provided with weights, for example cable 39b as shown in FIG. 2b having steel shot or the like 39c crimped thereon at intervals.

Figure 2C:
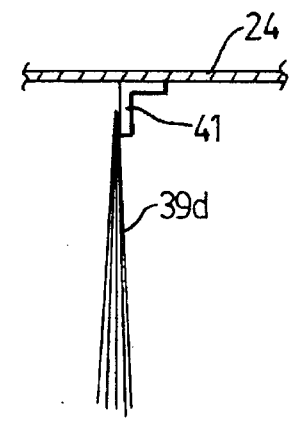

Alternatively, instead of using relatively heavy flexible members that are restored to a rest position by gravity, resiliently flexible members may be employed, such as resilient wire brushes 39d, as shown in FIG. 2c may be employed. These brushes 39d need not be disposed vertically within the trough 11, but may extend at non-vertical angles into the trough 11, usually and preferably downwardly from a connection point at an upper portion of the trough 11.

As will be appreciated, the adhesion and agglomeration inhibiting chains or other members 39b, c or d may be used to advantage with non-heat exchanging screw conveyors. Such screw conveyors are similar to those illustrated in FIGS. 1 and 2 except they do not have the jacket 34 or piping 36 for conveying heating or cooling medium.

While the detailed description above has referred to tacky rubber compounds the invention is by no means limited to such media.

Examples of other media to which the invention may be applied include polymers, polymer compositions, elastomers and elastomer compositions, other rubber compositions and mixtures of the same, in tacky conditions as a result of heating, chemical reaction, mechanical working and combinations of the same.

In the example shown, the members 39 are disposed along the entire length of the trough 11 from the entrance end 19 to adjacent the exit end 20. This is advantageous where the location or extent to which the media becomes or remains hot and tacky along the length of the trough 11 varies depending on through-put rates and temperatures of the media, temperatures and flow rates of cooling medium or heating medium and other conditions.

Where the process operates under steady state conditions without substantial variation in the location or extent of the tacky media it may be preferred to arrange the chains or other means inhibiting adhesion on the blade and agglomeration adjacent only a selected portion of the trough 11 sufficient to cover the extent along which the media is present in tacky condition.

Such portion will usually be an entrance end of the trough 11 in the case in which the media is received in a hot and tacky condition and is cooled by heat exchange and loses its tackiness as it progresses along the trough or will be an exit end in the case in which the media acquires tackiness as it progresses along the trough for example as a result of heating by heat exchange.

I claim:

1. A screw conveyor for tacky media, having a trough, an auger having a helical blade having an axis mounted in the trough, an inlet port for the media communicating with an entrance end of the trough, a discharge port for the media at an exit end opposite the entrance end of the trough, and means for rotating the auger about said axis to convey said media from the entrance to the exit end, wherein the improvement comprises means at least at one end of the trough for inhibiting media adhesion on the blade and agglomeration, said means comprising a plurality of depending chains normally disposed in a rest position extending into the trough generally laterally of said axis and engaged and deflected by said blade as it progresses along said axis, and said chains being subject to a restoring moment tending to forcefully restore said chains to the rest position from deflected positions such that the media is forcefully impacted by said chains and adherent media dislodged from the blade and agglomerates disintegrated.

2. A screw conveyor as claimed in claim 1, wherein said means for inhibiting media agglomeration and adhesion extend along substantially the entire length of the trough.

3. A screw conveyor as claimed in claim 1, including means for effecting heat exchange with the media in the trough.

4. A screw conveyor as claimed in claim 3, wherein the means for effecting heat exchange cool the media in the trough.

5. A screw conveyor as claimed in claim 4, where said means for inhibiting media adhesion on the blade and agglomeration extend at least at the entrance end of the trough.

6. A screw conveyor as claimed in claim 3, wherein the means for effecting heat exchange heat the media in the trough.

7. A screw conveyor as claimed in claim 6, wherein said means for inhibiting media adhesion on the blade and agglomeration extend at least at the exit end of the trough.

8. A screw conveyor for tacky media, having a trough, an auger having a helical blade having an axis mounted in the trough, an inlet port for the media communicating with an entrance end of the trough, a discharge port for the media at an exit end opposite the entrance end of the trough, and means for rotating the auger about said axis to convey said media from the entrance to the exit end, wherein the improvement comprises means at least at one end of the trough for inhibiting media adhesion on the blade and agglomeration, said means comprising a plurality of depending cables provided with weights normally disposed in a rest position extending into the trough generally laterally of said axis and engaged and deflected by said blade as it progresses along said axis, and said cables being subject to a restoring moment tending to forcefully restore said cables to the rest position from deflected positions such that the media is forcefully impacted by said cables and adherent media dislodged from the blade and agglomerates disintegrated.

9. A screw conveyor as claimed in claim 8, wherein said means for inhibiting media agglomeration and adhesion extend along substantially the entire length of the trough.

10. A screw conveyor as claimed in claim 8, including means for effecting heat exchange with the media in the trough.

11. A screw conveyor as claimed in claim 10, wherein the means for effecting heat exchange cool the media in the trough.

12. A screw conveyor as claimed in claim 11, where said means for inhibiting media adhesion on the blade and agglomeration extend at least at the entrance end of the trough.

13. A screw conveyor as claimed in claim 10, wherein the means for effecting heat exchange heat the media in the trough.

14. A screw conveyor as claimed in claim 13, wherein said means for inhibiting media adhesion on the blade and agglomeration extend at least at the exit end of the trough.

15. A screw conveyor for tacky media, having a trough, an auger having a helical blade having an axis mounted in the trough, an inlet port for the media communicating with an entrance end of the trough, a discharge port for the media at an exit end opposite the entrance end of the trough, and means for rotating the auger about said axis to convey said media from the entrance to the exit end, wherein the improvement comprises means at least at one end of the trough for inhibiting media adhesion on the blade and agglomeration, said means comprising a plurality of depending heavy wire ropes normally disposed in a rest position extending into the trough generally laterally of said axis and engaged and deflected by said blade as it progresses along said axis, and said ropes being subject to a restoring moment tending to forcefully restore said ropes to the rest position from deflected positions such that the media is forcefully impacted by said ropes and adherent media dislodged from the blade and agglomerates disintegrated.

16. A screw conveyor as claimed in claim 15, wherein said means for inhibiting media agglomeration and adhesion extend along substantially the entire length of the trough.

17. A screw conveyor as claimed in claim 15, including means for effecting heat exchange with the media in the trough.

18. A screw conveyor as claimed in claim 17, wherein the means for effecting heat exchange cool the media in the trough.

19. A screw conveyor as claimed in claim 18, where said means for inhibiting media adhesion on the blade and agglomeration extend at least at the entrance end of the trough.

20. A screw conveyor as claimed in claim 17, wherein the means for effecting heat exchange heat the media in the trough.

21. A screw conveyor as claimed in claim 20, wherein said means for inhibiting media adhesion on the blade and agglomeration extend at least at the exit end of the trough.

* * * * *